April 16, 1940.    P. O. KROGH    2,197,644
PILLAR CONSTRUCTION FOR AUTOMOBILE BODIES
Filed April 11, 1939
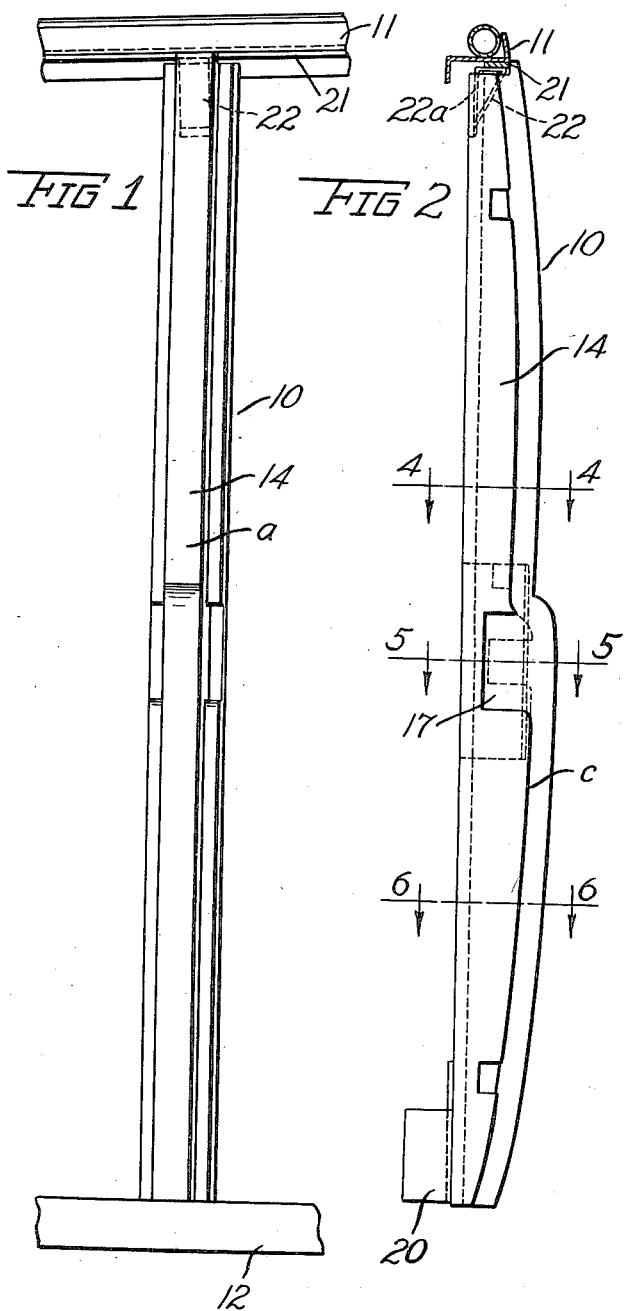
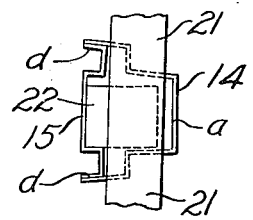
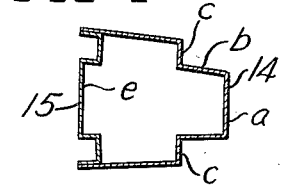
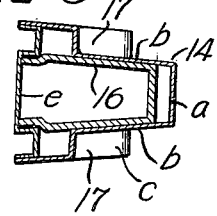
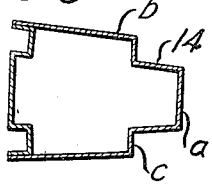
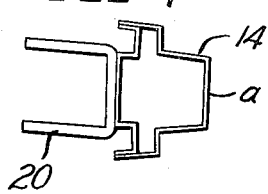
Inventor
Peter O. Krogh
By Owen & Owen
Attorneys.

Patented Apr. 16, 1940

2,197,644

UNITED STATES PATENT OFFICE 2,197,644

PILLAR CONSTRUCTION FOR AUTOMOBILE BODIES

Peter O. Krogh, Lima, Ohio, assignor to Superior Body Company, Lima, Ohio, a corporation of Ohio Application April 11, 1939, Serial No. 267,277

1 Claim. (Cl. 296—28)

This invention relates primarily to body frames for automobiles of the limousine type such as used for ambulances and funeral cars, and particularly to a pillar structure between front and rear side doors of such vehicle and against which the doors may close.

The object of the invention is the provision of an all-metal pillar of this character composed of a plurality of sheet metal sections shaped and combined in a manner to facilitate assembly and to produce a pillar which is simple and inexpensive in construction and which combines a maximum of strength with a minimum of weight and cost of manufacture.

The invention is fully described in the following specification, and one embodiment thereof illustrated in the accompanying drawing, in which—

Figure 1 is a perspective view of the outer side of a pillar embodying the invention, with the upper and lower body frame rails to which attached framentarily shown; Fig. 2 is a side edge elevation thereof; Fig. 3 is an upper end view of the pillar; Figs. 4, 5 and 6 are cross-sections thereof on the lines 4—4, 5—5 and 6—6, respectively, in Fig. 2, and Fig. 7 is a bottom end view of the pillar.

Referring to the drawing, 10 designates a pillar embodying the invention and 11 and 12 the longitudinally extending roof and foot body frame members, respectively, between which the pillar may be disposed and to which it is rigidly secured in any suitable manner.

The pillar includes a main or body member 14 of channel form which extends the full length of the pillar and may have its inner side edge, or that formed by the free edges of the side walls of the channel, substantially straight lengthwise thereof and its outer or closed side of a configuration conforming to the irregular side contour of the associated automobile body side, as shown at the right side of Fig. 2.

The channel member 14 has its loop or cross portion $a$ of a with suitable for the width of the spacing between the outer edges of doors which are adapted to close against the pillar at opposite sides thereof, and its opposing side walls $b$, $b$, are preferably disposed in slightly diverging relation inwardly from the outer side $a$ to add strength and rigidity to the pillar. Each side wall $b$ is provided with an outwardly offset shoulder $c$ which extends the entire length of the pillar and forms a striker or stop shoulder for the respective door to close against. The depth of this shoulder from the outer side $a$ of the pillar varies in accordance with the edge configuration of the doors used in connection therewith, as well understood in the art.

The inner or open side of the channel member 14 is closed by a strip 15 which is stamped from sheet metal and is provided with outstanding flanges $d$ along its longitudinal edges which fit into the member 14 in side abutment with the side walls thereof and are welded, or otherwise suitably fixed thereto. The strip 15 has a longitudinally extending central channel portion $e$ which adds strength to the member and also forms a seat for the open end of a U-shaped reinforcing member 16, which is mounted in the channel member 14 at the point of engagement of the door locks therewith. A recess (not shown) for receiving the door lock catch member is provided within a notch 17 in each shoulder $c$ of the pillar near its vertical center, as shown in Figs. 2 and 5. The member 16 is of metal and preferably welded to the members 14 and 15.

The pillar 10, in the present instance, is provided at the inner side of its lower end portion with a saddle member 20, which is welded to the pillar and is adapted to be attached to a suitable body frame part (not shown).

To facilitate securely attaching the upper end of the pillar 10 to the roof edge rail 11, a flat bar strip 21 is secured to the upper end of the pillar crosswise thereof between it and the edge rail 11, and is welded at points to the under side of such rail. The strip 21 is attached to the pillar end by a bracket piece 22 of strap metal which has a flat portion at its top underlying the strip 21 and welded or otherwise suitably attached thereto, and having at its inner end a leg 22ª extending down at the inner side of the filler piece 15 and welded thereto, and having at its outer end a similar leg extending down at an incline and being attached, preferably by welding, to the lower end portion of the leg 22ª.

It is apparent that I have provided a door pillar for automobile body frames, which is composed entirely of stamped metal parts that are capable of easy and rapid assembly in fixed relation and which produce a light, strong and inexpensive pillar.

I wish it understood that my invention is not limited to any specific construction, arrangement or form of the parts, as it is capable of numerous modifications and changes without departing from the spirit of the claim.

Having thus described my invention, what I claim as new, and desire to secure by United States Letters Patent, is:

A metallic door pillar comprising a main body of generally U-shape in cross section, having its opposing side walls each provided with an offset shoulder intermediate the side edges of the legs of the U to form strikers for the doors, a member having a part closing the open side of the body and formed with a pair of spaced inwardly projecting shoulders which latter are spaced from the side edges of the member, said member having its side edges out-turned and engaged with the inner faces of the sides of the body and secured to the latter, and a reinforcing member of U-shape in cross section fitted within the main body and having its closed side disposed adjacent to the closed side of the body, and having its sides engaging the sides of the body, and having the edge portions of its sides formed with inwardly extending offsets engaged with the shoulders of the member and secured to the latter.

PETER O. KROGH.